United States Patent
Martin et al.

(10) Patent No.: US 9,531,906 B2
(45) Date of Patent: Dec. 27, 2016

(54) METHOD FOR AUTOMATIC CONVERSION OF PAPER RECORDS TO DIGITAL FORM

(75) Inventors: Nathaniel G. Martin, Rochester, NY (US); Paul R. Austin, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1059 days.

(21) Appl. No.: 12/813,584

(22) Filed: Jun. 11, 2010

(65) Prior Publication Data

US 2011/0304890 A1 Dec. 15, 2011

(51) Int. Cl.
*H04N 1/60* (2006.01)
*H04N 1/00* (2006.01)
*H04N 1/46* (2006.01)
*H04N 1/32* (2006.01)

(52) U.S. Cl.
CPC ...... *H04N 1/32112* (2013.01); *H04N 1/00331* (2013.01); *H04N 1/32149* (2013.01); *H04N 1/32309* (2013.01); *H04N 1/32325* (2013.01); *H04N 2201/3226* (2013.01); *H04N 2201/3257* (2013.01)

(58) Field of Classification Search
USPC ............... 358/540, 538, 537, 530, 450, 452, 462,358/464, 470, 1.9, 1.16, 1.18, 1.1
See application file for complete search history.

(56) References Cited

U.S. PATENT DOCUMENTS

| | | | | |
|---|---|---|---|---|
| 3,839,625 A * | 10/1974 | Chadima, Jr. | .......... | G06K 19/00 235/495 |
| 3,887,793 A * | 6/1975 | Goodfinger | ........ | G06K 7/10861 235/436 |
| 3,909,787 A * | 9/1975 | Laurer | ....... | G06K 7/14 235/437 |
| 4,059,225 A * | 11/1977 | Maddox | ............. | G06K 7/10871 235/437 |
| 4,204,639 A * | 5/1980 | Barber | .................. | G06K 19/08 229/67.1 |
| 4,557,786 A * | 12/1985 | Stock | ........................ | B07C 3/00 156/350 |
| 4,605,214 A * | 8/1986 | Hanning | ................ | G06K 13/10 221/198 |
| 4,861,972 A * | 8/1989 | Elliott | ...................... | G06K 7/10 235/375 |
| 4,866,257 A * | 9/1989 | Elliott | ...................... | G06K 7/10 235/375 |
| 4,939,674 A * | 7/1990 | Price et al. | .................... | 358/1.9 |
| 5,043,563 A * | 8/1991 | Chi | .................... | G06K 7/10871 235/437 |
| 5,192,977 A * | 3/1993 | Kaneko | ................... | G03G 15/01 399/223 |
| 5,440,142 A * | 8/1995 | Maddox | .................. | G06K 7/10 235/437 |

(Continued)

*Primary Examiner* — Madelein Nguyen

(74) *Attorney, Agent, or Firm* — Michael J. Nickerson; Basch & Nickerson LLP

(57) ABSTRACT

A method of scanning a set of documents in a container such as a file folder or storage box where the container contains a unique label containing identification associated with the documents in the container. The label comprises both alphanumeric characters and color information where each character is associated with a particular color. By scanning the container and analyzing the image of the container the unique identification can be retrieved with increased reliability by using both the color and alphanumeric information.

19 Claims, 3 Drawing Sheets

(56) References Cited

U.S. PATENT DOCUMENTS

| | | | | |
|---|---|---|---|---|
| 5,513,017 | A * | 4/1996 | Knodt | G03G 15/50 358/471 |
| 5,640,647 | A * | 6/1997 | Hube | G06K 7/143 399/366 |
| 5,684,895 | A * | 11/1997 | Harrington | 382/233 |
| 5,761,686 | A * | 6/1998 | Bloomberg | 715/234 |
| 5,765,176 | A * | 6/1998 | Bloomberg | 715/209 |
| 5,828,771 | A * | 10/1998 | Bloomberg | 382/112 |
| 5,837,983 | A * | 11/1998 | Actis | G06K 7/14 235/383 |
| 5,946,123 | A * | 8/1999 | Lin | G02B 15/02 355/59 |
| 6,192,165 | B1 * | 2/2001 | Irons | G06F 17/30011 382/306 |
| 6,260,049 | B1 * | 7/2001 | Fitzgerald | G06Q 10/10 |
| 6,427,032 | B1 * | 7/2002 | Irons | G06F 17/30011 382/306 |
| 6,687,024 | B1 * | 2/2004 | Short | H04N 1/00002 358/406 |
| 6,744,938 | B1 * | 6/2004 | Rantze | G06K 9/00 382/312 |
| 6,754,037 | B1 * | 6/2004 | Ostwald | G11B 15/68 360/92.1 |
| 6,941,321 | B2 * | 9/2005 | Schuetze et al. | |
| 7,606,741 | B2 * | 10/2009 | King et al. | 705/27.2 |
| 8,115,955 | B2 * | 2/2012 | Nakano | H04N 1/00342 340/572.1 |
| 8,180,654 | B2 * | 5/2012 | Berkman et al. | 705/3 |
| 8,214,387 | B2 * | 7/2012 | King et al. | 707/770 |
| 2004/0162831 | A1 * | 8/2004 | Patterson | 707/100 |
| 2007/0133064 | A1 * | 6/2007 | Itogawa | H04N 1/2179 358/403 |
| 2007/0139692 | A1 * | 6/2007 | Martin | G06Q 10/06 358/1.15 |
| 2007/0253623 | A1 * | 11/2007 | Ohira | G06K 9/4638 382/218 |
| 2008/0024843 | A1 * | 1/2008 | Bloomberg et al. | 358/505 |
| 2009/0076839 | A1 * | 3/2009 | Abraham-Fuchs et al. | 705/2 |
| 2009/0112627 | A1 * | 4/2009 | Berkman et al. | 705/3 |
| 2009/0195804 | A1 * | 8/2009 | Kojima | H04N 1/00339 358/1.9 |
| 2009/0279143 | A1 * | 11/2009 | St. Jacques, Jr. | G06F 21/608 358/3.28 |
| 2009/0299762 | A1 * | 12/2009 | Martin | G06Q 10/10 705/2 |
| 2010/0069035 | A1 * | 3/2010 | Johnson | 455/404.1 |
| 2010/0092084 | A1 * | 4/2010 | Perronnin et al. | 382/170 |
| 2010/0104201 | A1 * | 4/2010 | Raichman | G06K 9/00 382/218 |
| 2010/0157381 | A1 * | 6/2010 | Chen | H04N 1/00689 358/449 |
| 2011/0096993 | A1 * | 4/2011 | Campbell | G06T 7/0081 382/180 |
| 2011/0293135 | A1 * | 12/2011 | Irons | H04N 1/2166 382/101 |
| 2013/0082111 | A1 * | 4/2013 | Shigekawa | G06K 19/06 235/487 |
| 2015/0234304 | A1 * | 8/2015 | Nagata | G03G 9/08755 430/105 |

* cited by examiner

METHOD FOR AUTOMATIC CONVERSION OF PAPER RECORDS TO DIGITAL FORM

BACKGROUND

In recent years as business records are increasingly kept in digital form, a need has arisen to convert older, paper-based records to digital format as well. Various ways have been devised to do this conversion, for example having each individual document scanned to convert it to digital form.

Another alternative is to have each document transcribed, that is, re-typed, to place the document into digital form. Such a transcription process is expensive and often prone to error due to the nature of the process and the difficulty of properly reading and interpreting any handwritten notes and data.

A variety of automatic scanning methods are being introduced that largely eliminate the manual transcription of the paper records. Such automatic methods may include some form of optical character recognition to further assist the transformation. For some records, it is sufficient to keep images of the pages of the paper record as opposed to extracting the relevant information from each page.

Often the older records are kept as collections grouped together by some underlying unifying measure. Commonly this unifying measure is customer identification or perhaps a patient identification.

One example is a medical practice that is converting to an all-electronic system of patient recordkeeping. A typical medical practice may have many thousand folders containing patient data that need to be digitized to be compatible with the new system.

Collections of records are common in other professional settings, for example legal offices, where there may be large amounts of paper documents associated with a particular case or client.

A step in the scanning process is to ensure that the scanned data from each collection is properly associated with the proper identification. This identification allows access to a database that allows access to all of the records associated with this particular entity, e.g. customer, client, or patient.

The transfer of the data in the paper records will thus result in adding to the existing data in the database. However, the scanned data should be properly associated with the data already in the system.

Current practices tend to have the operator of the scanning device key in the identification number. This manual entry is prone to error; and therefore, extra effort must be expended to ensure that the proper patient identification is associated with the scanned patient data.

Because of the need to keep track of the large volume of paper records systems have been devised to code the identification information on the container of the collection to assist in keeping each collection in its proper place. An example of this is the colored edge marking that is common in medical practice record keeping.

Therefore, it would be desirable to have way to utilize the existing coding of the identification to ensure proper extraction of the identification associated with a paper collection of information that is being processed for transfer to an electronic system.

BRIEF DESCRIPTION OF THE DRAWINGS

The drawings are only for purposes of illustrating various embodiments and are not to be construed as limiting, wherein.

DETAILED DESCRIPTION

Figure 1:
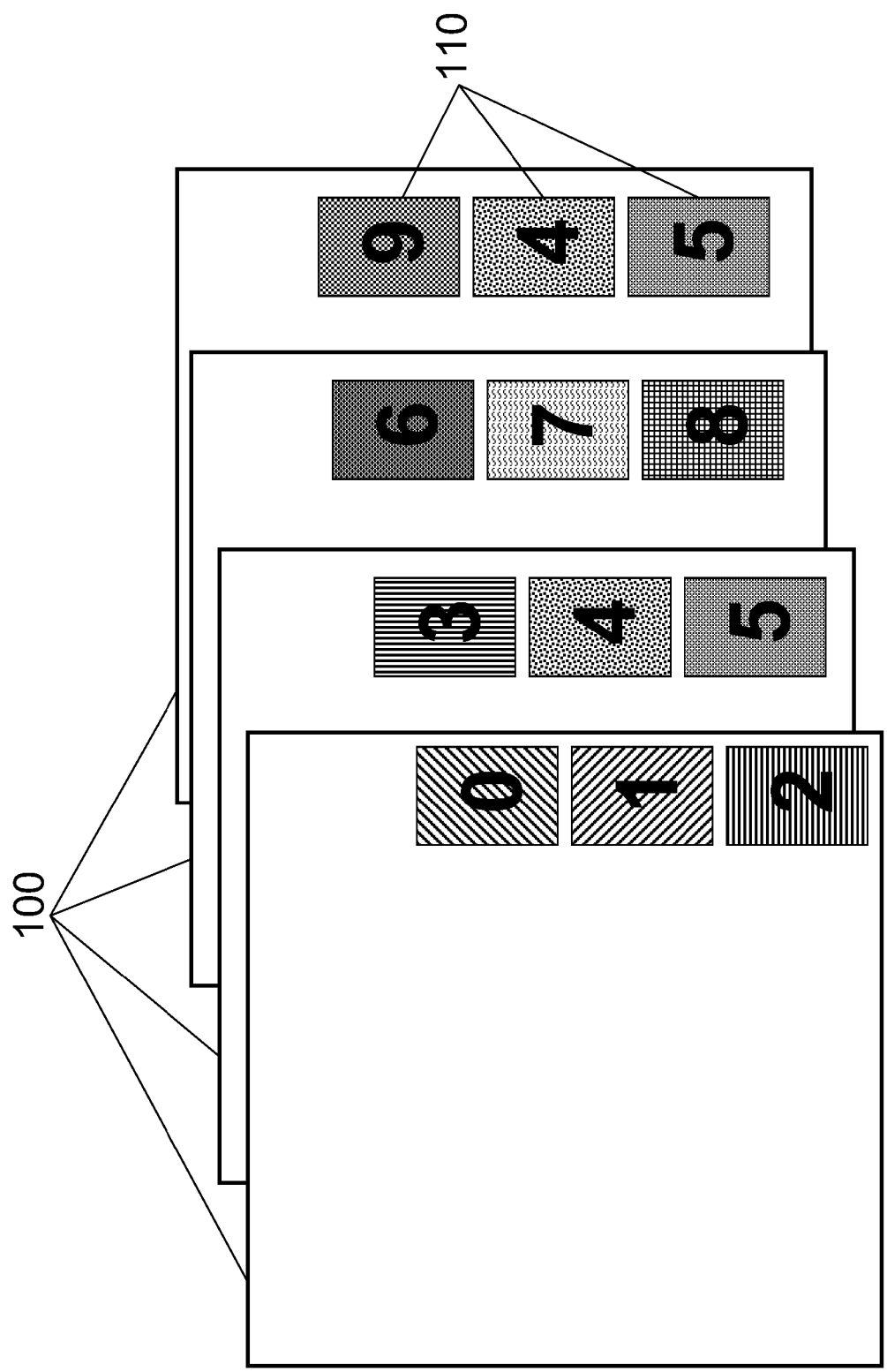
FIG. 1 illustrates an image of a set of folders where each folder contains a specially coded label identifying the information contained within each folder.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

The following description discusses a set of documents held in a container. The container may be a manila or cardboard folder as is common in many offices or it may take other forms. The method to be described is directed towards ensuring that when the set of documents is scanned that any identification information associated with the entire set of documents is properly recognized.

The container of the documents is assumed to have a label or some marking containing the identification. This identification may take the form of a set of alphanumeric characters, a set of color codes or a combination of both. The identification may take other forms as well.

For the sake of illustration, the description will use the example of a folder of medical records where the patient identification is encoded as a set of colored blocks on the edge of the folder with each block being associated with a one character of the patient identification.

Furthermore, the example used to illustrate the method described assumes that each colored block also has an alphanumeric character associated with it. This character may be a patient identification number or some set of letters from the patient's name that serves to uniquely identify the folder associated with the patient.

As an example of the container of documents that is to be scanned is shown in FIG. 1. FIG. 1 shows a set of folders 100 that might be used in a medical practice.

There is a separate folder for the records of each patient. Each patient is assigned a numerical patient identification 110 which is printed on the edge of the folder. Each number (alphanumeric character) of the patient identification 110 is printed on top of a block of color (illustrated by different fill patterns in FIG. 1) where each digit (character) is associated with a unique color (different fill pattern).

Since a typical medical practice may include many thousand of such folders this redundant encoding reduces the chance of misfiling a patient folder, since the orderly progression of colors that is characteristic of this kind of encoding would be broken and easily visible. The redundant encoding also provides an opportunity to increase the reliability of capturing the proper patient identification when the set of records in the folder is scanned.

Figure 2:
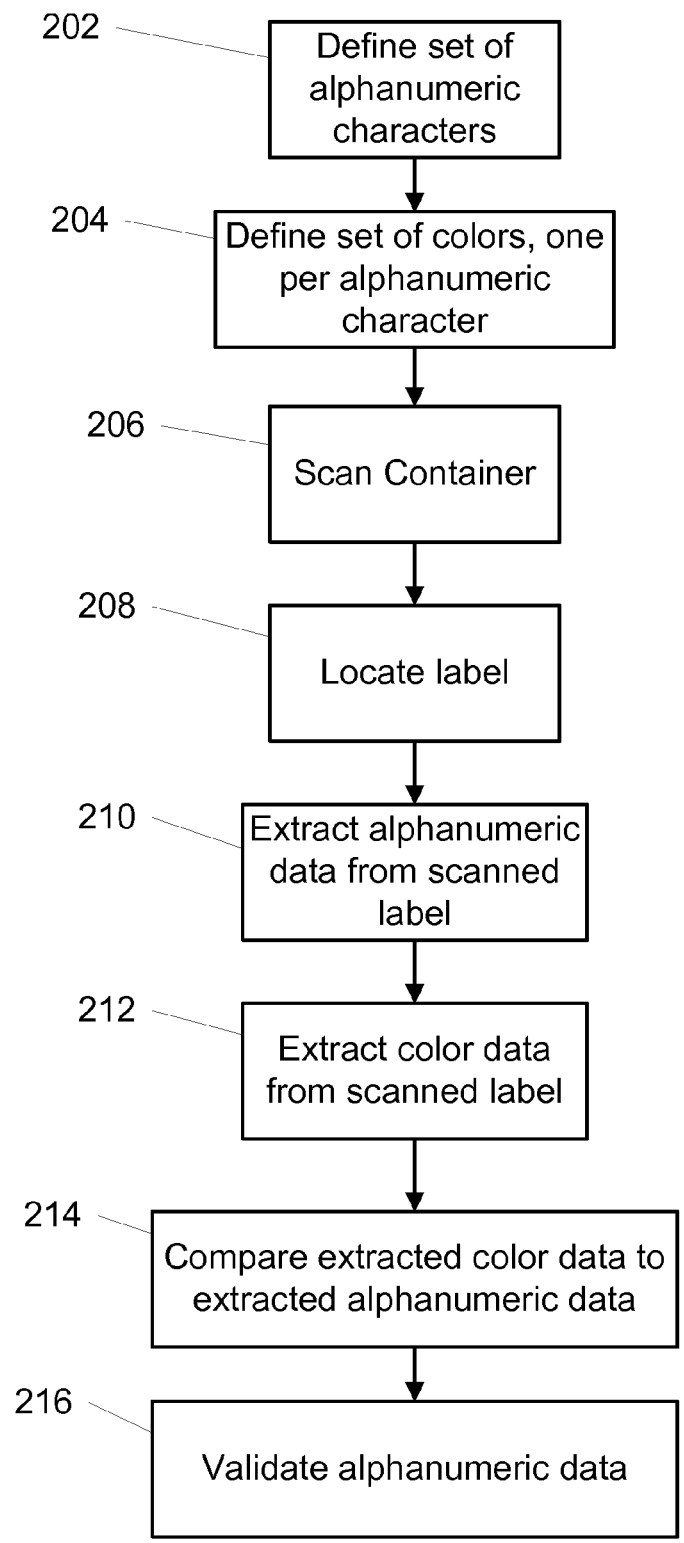
FIG. 2 illustrates a method to utilize color and alphanumeric encoding of identification information to verify the identity of information contained in a set of scanned documents.

FIG. 2 illustrates, in flowchart form, a method to extract identification information from the container of a set of documents that are being scanned to effect a conversion of the documents from hardcopy to digital form.

In step S202, a set of alphanumeric characters is selected that will serve as the set of characters that are used to define a set of unique identification tags for each set of records. These characters might be the digits 0 through 9 or they might be the characters of an alphabet.

In step S204, a set of unique colors is selected. Each unique color is matched to one of the previously selected alphanumeric characters. This one-to-one matching will be used as a redundant means of labeling each set of records.

Using the combination of colors and alphanumeric characters, each set of records is assigned a unique identification in step S206. This identification is printed on the container of the set of records. For example, the container might be a file folder containing medical records.

It is noted that another embodiment might have the container as a box containing a set of documents associated with a legal case.

It is assumed that steps S202, S204, and S206 are performed before any actual scanning takes place. Often the part of the process defined in steps S202, S204, and S206 has been established for a long time, before records were kept electronically.

When it is desired to convert the set of records from paper to digital form, the process begins, at step S208, by scanning the container. The scan will include the label of the set of records.

In step S210, the location of the label on the scanned image of the container is found. There are several methods that may be used to locate the label. One such method could include using pattern recognition to locate the set of characters and colors.

Another method of locating the label is to have the cover placed on the scanning apparatus in such a way that the label is always located in a specific place.

Yet, another method would present view of the scanned image on a display visible to the operator of the scanner and allowing the operator to identify the location of the label using some input method such as a mouse or touch screen.

Once the label has been located the alphanumeric data is separated in step S212. Simple methods of optical character recognition can be used to extract the alphanumeric information from the scanned image. While these methods are not completely reliable, the redundant information provided by the color will ensure that the proper identification is made. Furthermore, when the alphanumeric character set is limited, the reliability of the optical character recognition will be enhanced.

In step S214, the color information is extracted from the label image. The specific method of the extraction will depend on the way the color is encoded.

For example, when the color is encoded as a set of blocks of color on which each color has it's corresponding alphanumeric character printed the identification of the colored blocks can be made by identifying those areas of the label that are a distinctly different color from the background. Methods for identifying blocks of color in a digital image are well known in the art and will not be further described here.

The color information might be encoded by printing each alphanumeric character in its corresponding color; then the optical character recognition used to identify the alphanumeric characters can also identify the colors of each character.

Alternatively the colors can be identified by simply identifying the locations of the colors in the label that are different than the background color.

Once the color information and the alphanumeric information have been extracted they are compared, in step S216, to ensure that the two encodings of the identification of the record set is correct.

In step S218, when the two encodings are in agreement the identification of the record set is verified. A further embodiment might include displaying the identification that has been extracted and verified on a display visible to the operator of the scanner.

In such an embodiment, the operator would then confirm that the identified label information is correct, providing a further layer of confidence that the identification information is correct.

Once the record set identification has been verified the rest of the records in the set can be scanned and stored in some form of digital repository. Such a repository could be in the form of a database of records associated with the identification. The database may comprise a plurality of data forms.

For example, a medical record database might include doctor's notes, images of x-rays, records of EKG tests and others. Therefore, the exact form in which the set of records within the collection are stored is not necessarily important.

Documents may simply be stored as page images. Alternatively, text documents can be submitted to an optical character recognition program to convert the images to a more compact and editable form. The exact form that the storage takes will depend on the particular environment in which the records are used.

Figure 3:
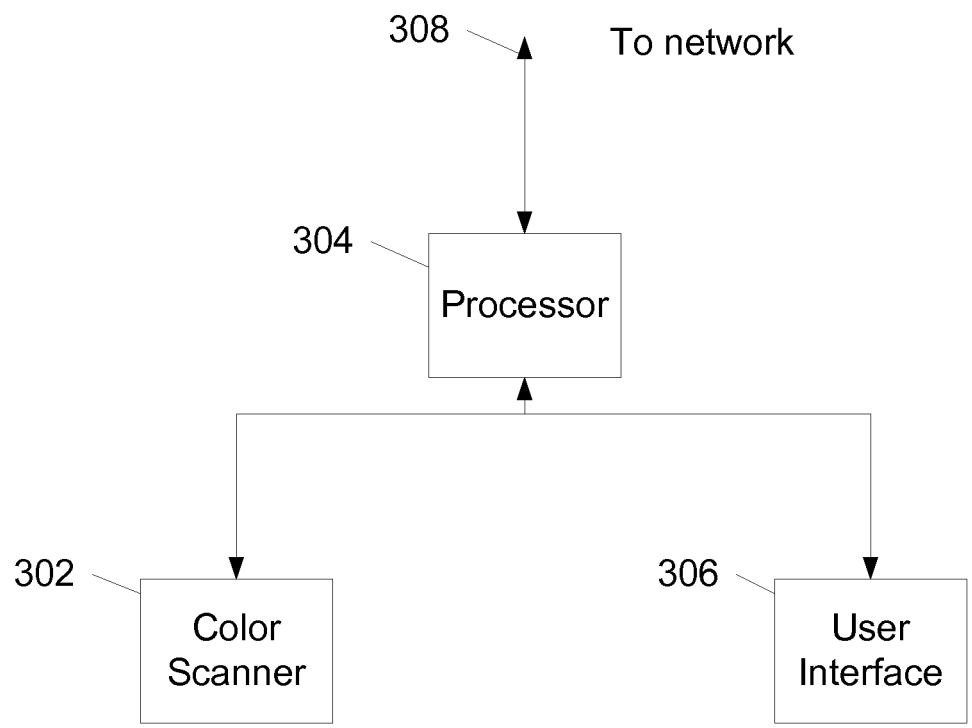
FIG. 3 illustrates a block diagram of a system to scan a set of documents to allow for redundant identification of the identity of a set of documents contained in a folder.

FIG. 3 shows a block diagram of a system that can scan a set of records in a container and properly retrieve the identification of the set of records. The container has a label wherein the label includes printed information identifying the set of records in the container. The label contains redundant information that encodes the identification of the record set. The redundant information is provided by using both a set of alphanumeric characters and a set of distinct colors to encode the record set identification. This redundancy allows the scanning process to reliably identify the set of records and therefore properly route the scanned records to a desired destination.

The system of FIG. 3 contains a scanner 302, a processor 304, a user interface 306 to the system, and an interface between the processor 304 and a network 308.

The scanner 302 may be a custom-made scanner or a commercially available model. Similarly, the processor 304 may be a custom-designed processor or a general processor capable of executing a set of computer instructions. The user interface 306 may contain both a display and an input device. The processor 304 is also interfaced to a network 308 to allow communication with remote systems that can accept data generated by the system of FIG. 3.

Although not illustrated, the system of FIG. 3 may include memory or other data storage devices to store the image data as the image data is being processed or to more permanently store the processed image data. Such data storage devices may include CDROMs, DVDROMs, portable hard drives, portable flash drives, hard drives, servers, or other data retention devices or systems.

In operation of the system of FIG. 3, an operator will begin by placing the container of the set of documents to be scanned onto the platen of the scanner 302 and initiating a scan operation by an action on the user interface 306. The action may take the form of a separate button to be pressed to start operations or may take the form a mouse click on an icon on a display of the user interface 306 or some other form of input action.

The scanner 302 scans the container and transmits the resulting digital image (image data) to the processor 304. The processor 304 will accept the digital image of the container, locate the label part of the digital image, and extract, from the label part of the digital image, both the alphanumeric data and the color data.

The alphanumeric data is converted, by optical character recognition or another equivalent process, to a digital form. The associated color data is identified.

The identification may take the form of matching the RGB values of each color patch against a set of RGB values that are associated with a predefined color set The processor 304 then checks that the proper number of characters and color blocks has been identified. The processor 304 then compares the extracted alphanumeric data with the alphanumeric characters associated with each of the detected color data.

Since the design of the label associates the color data and the alphanumeric data such that both the color data and the associated alphanumeric data encode the same identification, the comparison provides a determination of whether the scanned color and alphanumeric data encode the same identification information.

When the scanned color and alphanumeric data encode different identification information, a warning message may be issued to the user interface. The warning message may be accompanied by an audio or other signal to notify an operator of the system that there is a problem.

In an alternative embodiment, the system presents a copy of the scanned image on a display of the user interface and requests action on the part of the operator of the system to identify the location of the label in the image. One such action may use a mouse to click on one or more corners of the region of the image that contains the label.

Moreover, in another embodiment, a method for extracting identification information from a container to facilitate the storing and indexing of electronic images produced from scanning documents contained in the container may scan, using a scanner, a portion of the container to generate an electronic image thereof; electronically analyze a predetermined area of the electronic image to identify individual colors and individual characters therein; electronically identify, based upon the identified colors and characters, index information for the container; scan, using a scanner, the documents within the container to generate image data; electronically label the image data in accordance with the index information for the container; and store, in a data storage device, the image data at a location within the data storage device, associated with the index information for the container.

The method may provide a template that defines the predetermined area of the electronic image that contains the individual colors and individual characters to be analyzed.

Each character on the container may be surrounded by a specific color such that the identity of the character can be verified by comparing the identity of the character with the identity of the surrounding color.

Each character on the container may be printed by a specific color such that the identity of the character can be verified by comparing the identity of the character with the identity of the color used to print the character.

The method may electronically insert the index information for the container into metadata of the image data or electronically process image data in accordance with the index information for the container.

The method may accept input from a user interface that defines the location of the label containing the character data and the color data.

In addition, a system for extracting identification information from a container, the container containing a plurality of documents may include a scanner, the scanner generating a color digital image of objects placed on its input platen; and a processor, operatively connected to the scanner, to receive the color digital image of a document container, the document container including a label and image data, the label including a set of alphanumeric characters and a set of color data, the set of alphanumeric data and the set of color data encoding identification information associated with the documents contained in the container. The processor may extract from the color digital image a portion of the image that contains the image of the label; extract from the portion of the image that contains the image of the label the alphanumeric data and the color data on the label; convert the extracted color data into an equivalent alphanumeric form; compare the converted color data to the extracted alphanumeric data; verify that the converted color data and the extracted alphanumeric data are the same; electronically identify, based upon the converted color data to the extracted alphanumeric data, index information for the container when the converted color data and the extracted alphanumeric data are the same; electronically label the image data in accordance with the index information for the container; and/or cause the labeled image data to be stored in a data storage device at a location associated with the index information for the container.

The system may include a user interface to enable a user to provide a template that defines the predetermined area of the color digital image that contains the color data and alphanumeric data to be analyzed.

Each alphanumeric character on the container may be surrounded by a specific color such that the identity of the alphanumeric character can be verified by comparing the identity of the alphanumeric character with the identity of the surrounding color.

Each alphanumeric character on the container may be printed by a specific color such that the identity of the alphanumeric character can be verified by comparing the identity of the alphanumeric character with the identity of the color used to print the alphanumeric character.

The processor may electronically insert the index information for the container into metadata of the image data or electronically process image data in accordance with the index information for the container.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for extracting identification information from a container to facilitate the storing and indexing of electronic images produced from scanning documents contained in the container, comprising:

scanning, using a scanner, a portion of the container to generate electronic data representing an electronic image of the scanned portion of the container, the electronic data including color space image data representing an individual color and alphanumeric data representing an individual alphanumeric character;

electronically analyzing the color space image data within a predetermined area of the electronic image to identify the individual color within the analyzed predetermined area of the electronic image;

electronically analyzing the alphanumeric data within a predetermined area of the electronic image to identify the alphanumeric individual character within the analyzed predetermined area of the electronic image;

electronically identifying, based upon both the identified color and the identified alphanumeric character, index information for the container;

scanning, using a scanner, the documents within the container to generate image data;

electronically labeling the image data in accordance with the identified index information for the container; and storing, in a data storage device, the image data at a location within the data storage device, associated with the identified index information for the container.

2. The method as claimed in claim 1, further comprising:
providing a template that defines the predetermined area of the electronic image that contains the color space image data and the alphanumeric data to be analyzed.

3. The method as claimed in claim 1, wherein each alphanumeric character on the container is surrounded by a specific color such that the identity of the alphanumeric character can be electronically verified by electronically comparing the identity of the alphanumeric character with the identity of the surrounding color.

4. The method as claimed in claim 1, wherein each alphanumeric character on the container is printed by a specific color such that the identity of the alphanumeric character can be electronically verified by electronically comparing the identity of the alphanumeric character with the identity of the color used to print the character.

5. The method as claimed in claim 1, further comprising:
electronically inserting the identified index information for the container into metadata of the image data.

6. The method as claimed in claim 1, further comprising:
electronically processing image data in accordance with the identified index information for the container.

7. The method as claimed in claim 1, further comprising:
accepting input from a user interface that defines the location of the label containing the color space image data and the alphanumeric data.

8. The method as claimed in claim 1, wherein the color space image data is RGB image data.

9. The method as claimed in claim 8, wherein the identification of the individual color within the analyzed predetermined area of the electronic image is realized by matching the RGB values of the color space image data against a set of RGB values that are associated with a predefined color set.

10. The method as claimed in claim 1, wherein optical character recognition is used to analyze the alphanumeric data to identify the alphanumeric individual characters within the analyzed predetermined area of the electronic image.

11. A system for extracting identification information from a container, the container containing a plurality of documents comprising:

a scanner, the scanner generating color digital image data of objects placed on its input platen; and a processor, operatively connected to said scanner, to receive the color digital image data and to convert the color digital image data into color space image data representing an individual color and alphanumeric data representing an individual alphanumeric character;

said processor extracting, from the color digital image data, a portion of the color digital image data that contains a label;

said processor analyzing the color space image data of the portion of the color digital image data that contains the label to identify a color of the portion of the color digital image data that contains the label;

said processor converting the identified color into an equivalent alphanumeric form;

said processor analyzing, the alphanumeric data of the portion of the color digital image data that contains the label to identify the alphanumeric character in the portion of the color digital image data that contains the label;

said processor comparing the equivalent alphanumeric form of the converted identified color to the identified alphanumeric character in the portion of the color digital image data that contains the label to verify that the equivalent alphanumeric form of the converted identified color and the identified alphanumeric character are the same;

said processor, when the equivalent alphanumeric form of the converted identified color and the identified alphanumeric character are verified as the same, identifying, based upon the equivalent alphanumeric form of the converted identified color and the identified alphanumeric character, index information for the container when the equivalent alphanumeric form of the converted identified color and the identified alphanumeric character are the same;

said processor labeling the image data in accordance with the identified index information for the container;

said processor causing the labeled image data to be stored in a data storage device at a location associated with the identified index information for the container.

12. The system as claimed in claim 11, further comprising:
a user interface to enable a user to provide a template that defines the predetermined area of the color digital image that contains the color space image data and alphanumeric data to be analyzed.

13. The system as claimed in claim 11, wherein each alphanumeric character on the container is surrounded by a specific color such that the identity of the alphanumeric character can be verified by said processor comparing the identity of the alphanumeric character with the identity of the surrounding color.

14. The system as claimed in claim 11, wherein each alphanumeric character on the container is printed by a specific color such that the identity of the alphanumeric character can be verified by said processor comparing the identity of the alphanumeric character with the identity of the color used to print the alphanumeric character.

15. The system as claimed in claim 11, wherein said processor electronically inserts the identified index information for the container into metadata of the image data.

16. The system as claimed in claim 11, wherein said processor electronically processes image data in accordance with the identified index information for the container.

17. The system as claimed in claim 11, wherein the color space image data is RGB image data.

18. The system as claimed in claim 17, wherein the identification of the color of the portion of the color digital image data that contains the label is realized by matching the RGB values of the color space image data against a set of RGB values that are associated with a predefined color set.

19. The system as claimed in claim 11, wherein optical character recognition is used to analyze the alphanumeric data to identify the alphanumeric individual characters within the analyzed predetermined area of the electronic image.

* * * * *